Feb. 18, 1936.  H. S. LEE  2,031,049
APPARATUS FOR MANUFACTURING AND TREATING CEMENT CLINKERS
Filed Sept. 13, 1933
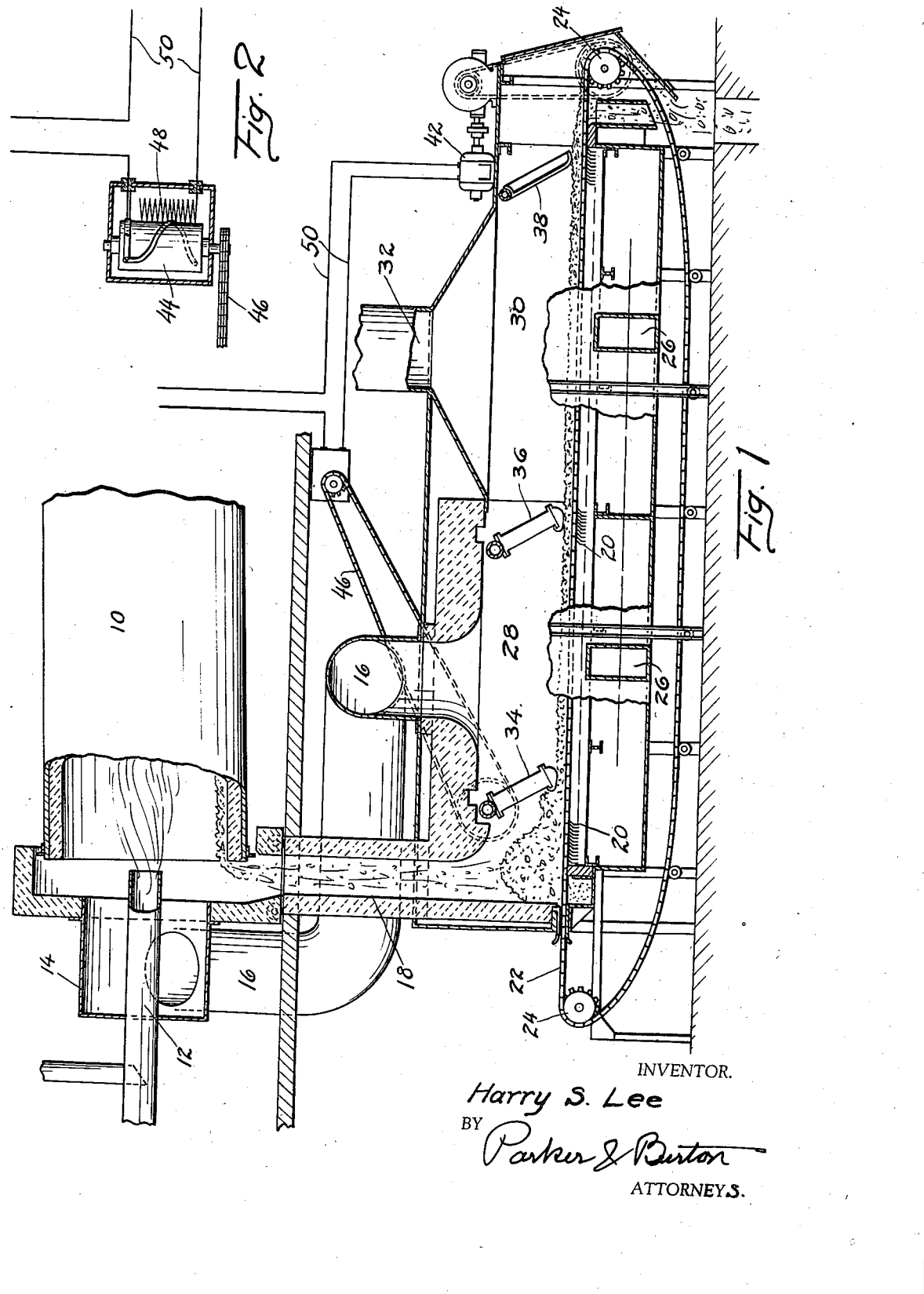
INVENTOR.
Harry S. Lee
BY
Parker & Burton
ATTORNEYS.

Patented Feb. 18, 1936

2,031,049

UNITED STATES PATENT OFFICE 2,031,049

APPARATUS FOR MANUFACTURING AND TREATING CEMENT CLINKERS

Harry S. Lee, Detroit, Mich.

Application September 13, 1933, Serial No. 689,205

1 Claim. (Cl. 263—32)

My invention relates to improvements in the method of and apparatus for manufacturing and treating cement clinkers.

In the manufacture of cement the aggregate which is used to form the cement clinker is passed through a kiln in which it is burned. It is discharged from the kiln into the cooling chamber wherein the temperature of the clinker is suitably reduced. In my application Serial No. 543,416 I have broadly disclosed and claimed apparatus of the same general type as is here shown wherein the cooling chamber is isolated from the kiln and is divided into a plurality of compartments. Air is taken from the first compartment wherein the temperature is highest to the kiln. This first compartment is segregated from the remaining compartments and the air passing through such remaining compartments does not effect the combustion in the kiln and the kiln operation does not become a function of the operation of such remaining compartments. In the first compartment, however, the operation does effect the functioning of the kiln because it is air which is taken from this compartment that is later delivered to the kiln.

In such application I show a drag chain which travels over a grate through the cooling chamber and advances the clinker in a moving bed through such cooling chamber and air is caused to be passed upwardly through this bed of clinker. The advance of the clinker through the cooling chamber is relatively slow and the amount of air which is passed through is relatively large. Discharge of the clinkers from the kiln into the cooling chamber varies in quantity from time to time due to the manner in which a clinker kiln functions. There is a tendency in the operation of a cement kiln for the clinker to collect at times in rings and to discharge in varying quantities and consequently the bed of clinkers carried on the chain through the cooling chamber is thereby varied in thickness from time to time depending upon the rate of discharge of clinker from the kiln into the cooling chamber.

In my application Serial No. 592,774, filed February 13, 1932, I have shown mechanism adapted to automatically speed up and to slack off the movement of the chain which advances the clinker through the cooling chamber at a rate which varies in response to variations in temperature of the air being delivered from the first compartment of the cooling chamber to the kiln. Such construction possesses certain advantages.

In my instant application I have shown apparatus adapted to automatically control the movement of the bed of clinker through the cooling chamber and to control the thickness of said bed of clinker passing through a selected portion of the cooling chamber, which is here shown as the entrance portion. This apparatus is responsive to a control exercised thereover being mechanism which itself responds to variation in thickness of a selected portion of the moving bed of clinker.

An object is that the control exercised is of such a character as to maintain a constant level of clinker on the chain and particularly a selected portion of such clinker by speeding up the chain or slowing up the chain thereby thinning out or allowing the clinker bed thereon to thicken as the case may be. I am thereby able to cool the clinker passing through the cooling chamber to a substantially uniform temperature and I am furthermore able to deliver from the selected forward portion of the cooling chamber, through which air is passed and delivered directly to the kiln, air at a substantially constant and uniform temperature to the kiln. This control therefore causes the kiln to function in a uniform and constant fashion.

An important characteristic of my invention is that this control is exercised by mechanism which responds to variation in thickness of the moving bed of clinker at the entrance to the cooling chamber. Specifically, I provide a gate which separates the cooling chamber from the kiln as to air communication when this gate rests upon the moving bed of clinker and acts to level the same and is actuated thereby. Mechanism is associated with the gate and it is actuated by the clinker bed which operates to control the speed of the conveying mechanism which advances the clinker bed and it is through this combination of elements whereby I maintain control over the speed and thickness of the clinker bed and through such control maintain a control over the temperature of the air which is delivered directly from a selected portion of the cooling chamber to the kiln and thereby ultimately control the functioning of the kiln.

Other objects and advantages and meritorious features of my construction will more fully appear from the following specification, appended claim, and accompanying drawing, wherein Figure 1 is a schematic illustration partly in cross section through apparatus embodying my invention, and Figure 2 is a fragmentary illustration of a control device.

In the drawing I have shown a rotary cement kiln indicated as 10. Cement aggregate is fed into the elevated end, which is not illustrated in the drawing, in a manner which is well known to the trade. Fuel and air is fed through a burner tube 12 into the kiln. An enclosure 14 surrounds this tube 12 and air is fed thereinto from a conduit 16 which leads from a selected forward portion of my cooling chamber. Apparatus of this general type is shown and disclosed in my copending application Serial No. 543,416.

Clinker is discharged from the kiln into a clinker chute 18 into the forward end of a cooling chamber. This cooling chamber is provided with suitable refractory walls and a stationary grate structure 20 over which is driven a conveyor in the form of an endless chain 22 supported upon the grate and at opposite ends by driving sprockets 24. Air is fed into the cooling chamber below the grate discharging thereinto from a manifold through suitable air passageways, such as 26, and this air passes upwardly through the moving bed of clinker and is taken off as hereinafter described. Generally this construction is illustrated in my application Serial No. 543,416.

The cooling chamber here shown is divided into a plurality of compartments, two being here illustrated. In the drawing there is a forward compartment 28 and a rear compartment 30. The air conduit 16 takes air from the forward compartment and delivers it into the bustle 14 to be discharged into the kiln. A conduit 32 takes air from a second compartment and exhausts it as it is desired. The cooling chamber is naturally provided with whatever number of compartments is believed to be desirable and is of such a length as to effect the desired cooling of the clinker and, as here shown, the clinkers may be discharged at the rear end of the chain through a suitable clinker chute. The compartments 28 and 30 in the cooling chamber are formed by a series of gate structures indicated as 34, 36, and 38, being the first, second, and third gates respectively. The construction of such gate structures is clearly shown in my application Serial No. 592,774 and is claimed therein. Such gate structures, however, serve to segregate the air space in the respective compartments into which the cooling chamber is divided whereby the air which passes through the compartment 28 is segregated from the air which passes through the compartment 30.

In the operation of a kiln of this type there is a tendency for the cement forming aggregate to collect at intervals and to form rings in the kiln and due to this and other reasons the discharge of burned clinker from the kiln is not always at a uniform rate and of a uniform quantity. This clinker piles up on the chain at the entrance to the cooling chamber as shown in the drawing. Normally the clinker chain moves at a determined slow rate through the cooling chamber and due to this variation in discharge of clinker onto the chain the thickness of the moving bed of clinker would vary from time to time. Due to this variation in thickness the clinker would not cool uniformly and what is especially important in a construction of the type here shown, the air which is delivered from compartment 28 to the kiln would vary in temperature due to the variation in thickness of the moving bed of clinker being advanced through this compartment 28.

I desire to control the temperature of this air so that it will remain at a uniform standard as well as to control the quantity of it and I accomplish this through control exercised over the thickness of the bed of clinker. It is therein that my invention herein defined lies.

The gate members 34, 36, and 38 are mounted to swing, as more particularly shown in my copending application above referred to, and they serve to level off the clinker bed. Obviously the gate member 34 will raise and fall as the clinker bed increases or decreases in thickness and I control the movement of the bed and consequently its thickness by a control which is responsive to the lifting and falling of this gate 34.

I have here illustrated merely one type of mechanism which is adapted to perform this function. It is understood that other mechanism might be provided. The chain is driven by drive mechanism indicated conventionally as 40 which is adapted to drive the chain at varying rates of speed and is driven by a variable speed motor 42 from a suitable source of power supply.

The control of the movement of the bed of clinker is accomplished by varying the speed of motor 42 which may be controlled by mechanism as illustrated in Figure 2. In Figure 2 I have shown one form of variable resistance wherein there is a rotary member 44 adapted to be oscillated by a chain 46 upon the raising or lowering of the gate 34 and by its oscillation to increase or decrease the resistance 48 which is in circuit through the circuit 50 with the motor 42 and thereby vary the speed of the chain. It is apparent that other devices might be provided to accomplish this same end.

The arrangement is such that as the thickness of the bed of clinker on the chain increases the speed of the chain is increased so as to thin out the bed of clinker and maintain it at a substantially constant and uniform thickness.

What I claim is:

Apparatus for the manufacture and treatment of cement clinkers comprising a primary combustion chamber wherein cement clinker is formed, a clinker treatment chamber into which the primary combustion chamber discharges highly heated cement clinkers, means for advancing said cement clinkers in a continuous stream through said treatment chamber, means for directing an air draft through said advancing stream of cement clinkers within the treatment chamber, means for taking air heated by being passed through the forward end of the clinker treatment chamber and delivering the same to the primary combustion chamber, valve means engaging the moving stream of clinkers preventing an uncontrolled quantity of air from passing into the primary combustion chamber from the clinker treatment chamber, and mechanism responsive to the rise and fall of said valve means in response to the increase and decrease in thickness of the stream of clinkers travelling thereunder operable to vary the rate of travel of the clinker advancing means.

HARRY S. LEE.